United States Patent [19]

Edelman

[11] 4,395,514
[45] Jul. 26, 1983

[54] PROCESS FOR PREPARING A CARBON FIBER REINFORCED COMPOSITE ARTICLE WHICH UTILIZES A POLYIMIDE MATRIX

[75] Inventor: Robert Edelman, Staten Island, N.Y.

[73] Assignee: Celanese Corporation, New York, N.Y.

[21] Appl. No.: 343,868

[22] Filed: Jan. 29, 1982

Related U.S. Application Data

[62] Division of Ser. No. 141,701, Apr. 18, 1980, Pat. No. 4,338,430.

[51] Int. Cl.$^3$ .............................................. C08L 67/02
[52] U.S. Cl. ................................... 524/600; 528/222; 528/229; 528/336; 528/342; 528/351; 528/353; 428/473.5; 524/602
[58] Field of Search ................. 524/600, 602; 528/222, 528/229, 336, 342, 351, 353; 428/473.5

[56] References Cited

U.S. PATENT DOCUMENTS

| | | | |
|---|---|---|---|
| 3,528,950 | 9/1970 | Lubowitz | 528/353 |
| 3,575,924 | 4/1971 | Bargain | 528/322 |
| 3,647,529 | 3/1972 | Lubowitz et al. | 524/600 |
| 3,671,490 | 6/1972 | Bargain | 528/173 |
| 3,745,149 | 7/1973 | Serafini et al. | 528/229 |
| 3,763,114 | 10/1973 | Saluti et al. | 528/342 |
| 3,772,254 | 11/1973 | Jones | 528/353 |
| 4,110,294 | 8/1978 | Pickering et al. | 524/600 |
| 4,146,668 | 3/1979 | Dorey et al. | 524/600 |

OTHER PUBLICATIONS

Physical Chemistry of High Polymeric Systems, Mark et al., Second Edition, (1950), pp. 274–275.

*Primary Examiner*—Harold D. Anderson
*Attorney, Agent, or Firm*—Burns, Doane, Swecker & Mathis

[57] ABSTRACT

The present invention provides an improvement in a process for preparing carbon fiber reinforced polyimide compositions from a mixture of monomers by the application of heat in two stages. The improvement comprises incorporating a cyclic peroxyketal catalyst, such as 3,6,6,9,9,-pentamethyl-3-(ethylacetate)-1,2,4,5-tetraoxycyclononane, into the monomer mixture prior to reaction.

7 Claims, No Drawings

PROCESS FOR PREPARING A CARBON FIBER REINFORCED COMPOSITE ARTICLE WHICH UTILIZES A POLYIMIDE MATRIX

This application is a division of application Ser. No. 141,701, filed Apr. 18, 1980 now U.S. Pat. No. 4,338,430.

BACKGROUND OF THE INVENTION

Polyimides which exhibit excellent thermooxidative properties and which therefore are contemplated for use in making carbon fiber composites employed in the aerospace industry are currently available and have been known for some time as illustrated by U.S. Pat. Nos. 3,528,950; 3,575,924; 3,671,490; and 3,745,149. At least some of the polyimides described in these patents are similar to the extent that they are derived from three basic types of monomers, such as, a dianhydride or ester derivative thereof, a polyfunctional amine, and an unsaturated monoanhydride or ester derivative thereof.

The processes for preparing these polyimides, however, vary considerably. For example, U.S. Pat. Nos. 3,575,924 and 3,671,490 disclose a process wherein an intermediate polyamide acid is formed by the reaction of a dianhydride and a diamine in an anhydrous solvent. The polyamide acids thus produced are then converted into polyimides by reaction with an unsaturated anhydride which occurs in one or two reaction stages. In one embodiment, polyamide acid and unsaturated anhydride are heated to a temperature between 100° and 450° C. in a single operation. In another embodiment, the polyamide acid and unsaturated anhydride are subjected to a cyclizing dehydration using a dehydrating agent, to form a linear polyimide which is then heated to a temperature between 80° and 350° C. A peroxide catalyst such as benzoyl peroxide may be employed in either embodiment for carrying out the reaction of the polyamide acid but not during the formation of the polyamide acid.

The polyamide acid which is formed as described is unstable and must be kept in solution, hermetically sealed and refrigerated if not utilized within a few hours. Special handling and storage greatly increases the ultimate cost to the user. Such polyamide acids require curing by heat treatment to the final polyimide for periods of from 5 to 16 hours and such curing results in the evolution of appreciable amounts of volatile materials.

U.S. Pat. No 3,528,950 discloses a method for preparing high molecular weight polyimides without the necessity of forming the polyamide acids. Thus, a low molecular weight prepolymer is prepared by reacting a poly-functional amine, a poly-functional anhydride, and an unsaturated monoanhydride, such as nadic anhydride, by refluxing for a period of 18 hours.

Such treatment yields two polyimide prepolymers, one of a higher molecular weight and a second of a lower molecular weight, which are subsequently blended in dry-powder form. The blend of prepolymer is then heated to a temperature of 200° to 350° C. to form polyimide macro-molecules. While utilization of such prepolymers eliminates the instability problems that are encountered with the polyamide acid approach, the preparation of the prepolymer is very time-consuming and requires the separate step of blending the two prepolymers that are formed in the refluxing step prior to heating to cure the macro-molecular polyimide.

U.S. Pat. No. 3,745,149 discloses a process for preparing certain polyimides by heating a mixture of solvent, and monomer compounds which include an ester derivative of a tetracarboxylic acid, a diamine, and an ester derivative of an unsaturated monoanhydride, such as nadic anhydride. The monomer-solvent mixture may be heated at temperatures of 50° to 205° C. (i.e., 122° to 401° F.) to form a low molecular weight prepolymer. The prepolymer can then be heated at temperatures of about 275° to about 350° C. (i.e., 527° to 662° F.) to obtain chain extension and/or cross-linking of the prepolymer. Alternatively, the monomer mixture may be heated initially at temperatures of about 275° to 350° C. for a period of about 30 minutes to one hour to obtain the crosslinked high molecular weight polyimide. The method described in this patent avoids the need to form the unstable polyamide acid. However, very high temperatures are required to achieve final cure of the polymer over extended periods of time.

For example, a particularly preferred polyimide can be prepared from a mixture of monomers known as LARC-160.

These monomers include benzophenone tetracarboxylic acid diester (BTDE), Jeffamine AP-22 ™, and the monoethylester of nadic anhydride. These three monomers have heretofore required an extensive and time-consuming cure cycle wherein the monomers are slowly heated to temperatures of about 285° to about 350° F., e.g., 325° F., and maintained at this temperature for one hour to form the prepolymer. The temperature is then slowly raised to 600° F. (301° C.) and maintained thereat for an additional two hours. At the end of the cure cycle, the material is subjected to a four hour post cure at 600° F. (301° C.).

Other patents which disclose high temperature resistant polyimides include U.S. Pat. Nos. 3,772,254 and 4,110,294.

It would be a distinct advantage if it were possible to lower the temperature of the second stage of the cure cycle of polyimides, such a those derived from LARC-160 (discussed in detail hereafter), below that currently employed to temperatures of about 350° to 400° F. This would permit the use of the same bagging and adhesive materials currently used in the autoclave curing of epoxies. At elevated cure temperatures much more expensive sealers and vacuum bags would have to be employed. The ability to employ low temperature epoxy curing techniques and apparatus would make it possible to take advantage of the potentially better stability of polyimides when exposed to use temperatures of about 160° to about 180° F. in humid environments than is exhibited by currently used epoxy systems provided the extent of cure which occurs at these temperatures imparts acceptable chemical and physical properties to the resulting polyimide. Lower cure temperatures therefore would render the polyimide composition a preferred alternative to epoxy materials which cure at temperatures of about 350° F., in those end-use applications involving exposure to hot humid environments at temperatures up to about 180° F. and where stability upon sporadic increses in temperature up to about 350° F. must be exhibited.

It would be a further advantage to reduce the cure time currently employed for preparing polyimides at the standard second stage curing temperatures used in preparing polyimides (eg. about 600° F.). Standard curing temperatures would be employed if one wanted to take maximum advantage of the thermooxidative resistant properties obtainable from polyimides at temperatures of about 500° to 550° F. In such instances, the same materials currently used in curing polyimides would continue to be used.

While many catalysts are known to facilitate the crosslinking reaction of unsaturated species, the selection of an appropriate catalyst to be used in a process conducted generally in accordance with U.S. Pat. No. 3,745,149 for preparing crosslinked polyimides is complicated by the requirement that such a catalyst must be added to the mixture of all the monomers prior to their polymerization to form even the prepolymer. This requirement is necessitated by the fact that once the prepolymer is formed it is extremely difficult to uniformly disperse a catalyst therein particularly in a solventless system. Thus, a suitable catalyst must not only be soluble in the mixture of monomers it must also be inactive during much of the prepolymer formation in the sense that it does not cause the double bonds present on the monomers to react, and non-volatile at the relatively elevated temperatures employed over the entire course of the two stage polymerization process. In addition, a suitable catalyst must be capable of being activated only upon completion of the prepolymer formation. The extent of the crosslinking reaction which is induced by the catalyst at the second stage cure temperature is preferably sufficient to impart enough strength to a polyimide prepreg composite that it can be used directly with no further curing or alternatively can eventually be subjected to a free standing post-cure. The ability to undergo a free standing post-cure is desired since currently used prepregging epoxy resins can meet this requirement and a viable commercial substitute for epoxy resins in a prepregging system should also be amenable to this type of procedure. Obviously, where no post-cure is necessary an even greater advantage over epoxy resins is exhibited.

To date, a catalyst which meets all of the above requirements has not yet been identified.

While U.S. Pat. Nos. 3,575,924 and 3,671,490 disclose broadly that peroxide catalysts can be employed in the process described therein, the requirements of this process are different from those of the present invention used to prepare the polyimide, since the peroxide catalysts of the above described patents are added to a polyamide acid (e.g. the reaction product of an aryl dianhydride and an arylamine) and not to a mixture of monomer reactants of the type described herein. In the past, aromatic amines, such as phenyl-β-naphthylamine which is similar to the arylamine monomers employed in the present invention have been used as an antioxidant to scavenge free radicals in a variety of environments. It would therefore be expected that peroxide catalysts would be rendered ineffective by reaction with the aromatic amine monomers.

Cyclic peroxides such as illustrated in R. Pastorino et al "Cross-linking HDPE With Cyclic Peroxyketals", Modern Plastics Vol. 55 pp. 86–88 (1978); and those illustrated in U.S. Pat. Nos. 3,117,166; 3,419,577; and British Pat. Specification No. 1,329,859 are known in the art and many have been employed for catalyzing the reaction of a variety of unsaturated monomers as well as polyethylene, rubber and the like. None of these peroxides, however, are believed to have been employed in a polymerization process for preparing polyimides in accordance with the procedures described herein.

It is therefore an object of the present invention to provide a process for preparing polyimides which permits the use of cure temperatures which are sufficiently low that such polyimides may be processed and cured in accordance with techniques typically employed in connection with epoxy resins.

It is a further object of the present invention to provide a process for preparing polyimides which permits the use of shortened cure times at standard curing temperatures while still imparting good chemical and mechanical properties to the polyimides.

It is still a further object of the present invention to provide a composite structure which employs a polyimide resin matrix and which can be prepared using techniques typically employed in preparing carbon fiber-epoxy composites.

It is another object of the present invention to provide a polyimide forming composition capable of use in preparing composite structures.

These and other objects and features of the invention will become apparent from the claims and from the following description.

SUMMARY OF THE INVENTION

In one aspect of the present invention there is provided an improvement in a process for preparing polyimides by reacting a mixture of monomers comprising:

(a) esters of the formula:

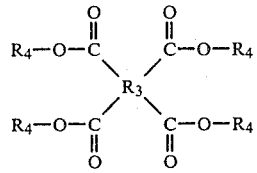

wherein $R_3$ is a tetravalent aryl radical, and $R_4$ is selected from the group consisting of a lower alkyl radical having 1 to 4 carbon atoms, and hydrogen, with at least two $R_4$ groups being alkyl;

(b) amines of the formula:

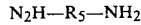

wherein $R_5$ is a divalent aryl radical; and (c) esters of the formula:

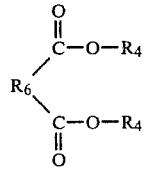

wherein $R_4$ is selected from the group consisting of a lower alkyl radical having 1 to 4 carbon atoms, and hydrogen with at least one $R_4$ group being alkyl, and $R_6$ is a divalent radical of the formula:

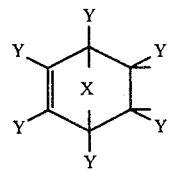

wherein Y, which may be the same or different, is selected from the group consisting of hydrogen, and methyl and X is an alkylidene radical of from 1 to 6 carbon atoms; said reaction being conducted by the application of heat to the mixture of said monomers in two stages, wherein in the first stage the monomer mixture is heated to a temperature sufficient to form a prepolymer having a molecular weight of not greater than 10,000, and in the second stage the prepolymer is heated to a temperature sufficient to cross-link said prepolymer to form a polyimide. The improvement comprises incorporating into the mixture of said monomers prior to reaction at least one peroxide catalyst of the formula:

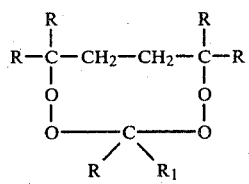

wherein R, which may be the same or different, is a lower alkyl group having from 1 to about 3 carbon atoms, and $R_1$ is an alkyl acetate group of the formula:

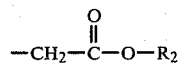

wherein $R_2$ is an alkyl group having from 1 to about 4 carbon atoms, in an amount of from about 0.5 to about 15%, by weight, based on the weight of the mixture of monomers.

In another aspect of the present invention there is provided a carbon fiber composite structure which employs a polyimide composition prepared in accordance with the above-described process as the matrix component thereof.

In a further aspect of the present invention there is provided a polyimide forming composition which comprises the mixture of the above-described catalyst and monomer mixture.

DESCRIPTION OF THE PREFERRED EMBODIMENTS

As described hereinabove, polyimides have been prepared in the past by heating a mixture of certain monomers to a temperature sufficient to form a prepolymer having a number average molecular weight of not greater than about 10,000, and typically from about 400 to about 10,000. The prepolymer is then heated at a temperature sufficient to cause the prepolymer to cross-link. The formation of the prepolymer is referred to herein as the first stage of cure, and the formation of the crosslinked polyimide is referred to herein as the second stage of cure.

The temperature employed in the first stage of cure is generally at least about 120° F., and typically about 250° to about 350° F.

The temperature employed in the second stage of cure is generally greater than about 400° F., and typically about 525° to about 625° F.

When LARC-160 monomers (described hereinafter) have been employed to prepare a high molecular weight polyimide, the temperature employed in the first stage of cure has typically varied from about 275° to about 400° F., while the temperature employed in the second stage of cure has typically varied from about 500° to about 635° F., and preferably from about 525° to about 625° F.

The present invention provides a process wherein the temperature of the second stage of cure can be substantially lowered or alternatively, the cure time substantially shortened at standard cure temperatures, by the dissolution of a cyclic peroxyketal catalyst or mixtures thereof into a mixture of certain monomers used to prepare polyimides by the two stage curing process as described above.

The cyclic peroxyketal catalyst may be represented by the structural formula:

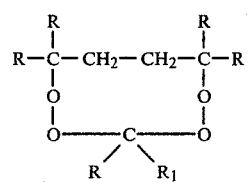

(I)

wherein R which may be the same or different is a lower alkyl group having from 1 to about 3, preferably 1 to about 2, carbon atoms and $R_1$ is an alkyl acetate group which may be represented by the structural formula:

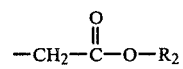

(II)

wherein $R_2$ is an alkyl group having from 1 to about 4, preferably from 1 to about 2 carbon atoms.

The preferred catalyst which is available from WITCO Chemical U.S. Peroxygen division under the tradename USP-138 ™ is 3,6,6,9,9-pentamethyl-3-(ethylacetate)-1,2,4,5-tetraoxycyclononane which can be represented by structural formula I wherein all the R groups are methyl and $R_1$ is an ethyl acetate group.

The above catalysts can be prepared by any method well known in the art such as by etherifying an appropriate diol with an equimolar amount of an appropriate dihydroperoxide in accordance with the procedures described in U.S. Pat. No. 3,419,577 the disclosure of which is herein incorporated by reference.

The high temperature resistant polyimides which are prepared in the presence of the above described catalysts are synthesized from a mixture of monomer compounds comprising:

(a) esters of the formula:

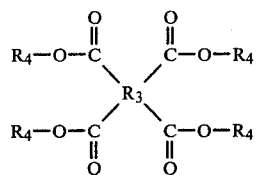

(III)

wherein $R_3$ is a tetravalent aryl radical and $R_4$ is a lower alkyl radical having 1 to 4, preferably 1 to 2 carbon atoms, or hydrogen, with two $R_4$ groups being alkyl and two $R_4$ groups being hydrogen.

(b) amines of the formula:

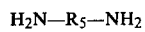

$$H_2N-R_5-NH_2 \qquad (IV)$$

wherein $R_5$ is a divalent aryl radical. The preferred amines can be represented by the structural formula IV wherein $R_5$ is a divalent aryl radical of the formula:

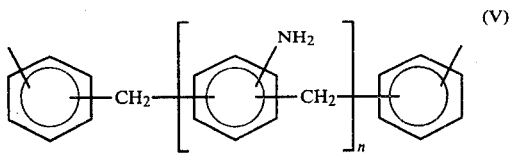

wherein n is an integer the average value of which can vary from about 0 to about 2, and (c) esters of the formula:

wherein $R_4$ is defined as above in formula III with one $R_4$ group being alkyl and one $R_4$ group being hydrogen, and $R_6$ is a divalent radical of the formula:

wherein Y which may be the same or different is selected from the group consisting of hydrogen, and methyl. Preferably Y is hydrogen and X is an alkylidene radical of from 1 to about 6, preferably from 1 to 3, carbon atoms.

The half esters of the tetracarboxylic acid defined in formula III above may be readily prepared according to the known methods from the corresponding dianhydrides of the formula:

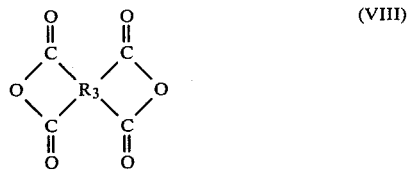

wherein $R_3$ is as defined above. Representative of the many dianhydrides which may be employed include pyromellitic dianhydride; 3,3',4,4'-benzophenone tetracarboxylic dianhydride; 2,3,6,7-naphthalene tetracarboxylic dianhydride; 1,2,5,6-naphthalene tetracarboxylic dianhydride; 2,2',3,3'-diphenyl tetracarboxylic dianhydride; bis(3,4-dicarboxyphenyl)sulfone dianhydride, and 1,4,5,8-naphthalene tetracarboxylic dianhydride.

Representative amines of the type defined in formula IV above include benzidine, 4,4'-methylenedianiline, 3,3'-methylene dianiline, m-phenylenediamine, and p-phenylenediamine, 4,4'thiodianiline, 4,4'-oxydianiline, 4,4'-diaminodiphenylsulfone, and Jeffamine AP-22 TM described hereinafter.

The half ester of the dicarboxylic acids defined in formula VI may be prepared readily from the corresponding anhydride of the formula:

wherein $R_6$ is as defined above. Representative examples of such anhydrides include maleic anhydride, 5-norbornene-2,3-dicarboxylic anhydride, also known as nadic anhydride, and methyl-5-norbornene-2,3-dicarboxylic anhydride.

The preferred polyimide is prepared from a mixture of (1) the diethylester of benzophenone tetracarboxylic acid (BTDA), (2) a mixture of aromatic amines comprising about 75 mole percent methylene dianiline and about 25% mole percent higher molecular weight oligomers wherein n in structural formula V defining $R_5$ in structural formula IV can vary from about 1 to about 2 (available from Jefferson Chemical Co., Inc. under the tradename Jeffamine AP-22 TM ), and (3) the monoethylester of nadic anhydride.

The mixture of the above three preferred monomers are referred to herein as LARC-160. For a further discussion of LARC-160 polymers see the technical paper presented at the Eighth National SAMPE Technical Conference by T. St. Clair & R. Jewell entitled "LARC-160: A New 550° F. Polyimide Laminating Resin" (1976); and the technical paper presented at the Twenty-Third National SAMPE Symposium by T. St. Clair and R. Jewell entitled "Solventless LARC-160 Polyimide Resin" (1978).

The polyimide is prepared by mixing monomers a, b, and c at a molar ratio of n:(n+x):y respectively wherein n is an integer of from 1 to 20, preferably from about 1 to 10, and most preferably from about 1 to 5, x is an integer of from about 0.5 to about 1, and y is an integer of from about 1.5 to about 2. When the LARC-160 monomers described herein are employed the molar ratio of monomers a, b, and c can vary from about 1:1.6:1.5 to about 1:1.6:2 respectively.

The preferred method of preparing the polyimide can vary depending on whether Jeffamine AP-22 TM is employed as one of the monomers or not.

Typically the monomer mixture is dissolved in a suitable solvent which may be reactive or non-reactive.

It is to be understood that the reactivity of the solvent will depend on the form in which monomers (a) and (c) are initially mixed, i.e., half ester or anhydride. When the monomers are initially mixed in their half ester form a non-reactive solvent is usually employed. However, when the monomers are initially mixed in their anhydride form a reactive solvent can be employed to convert the anhydride to its corresponding half ester. Thus, the term "reactive solvent" as employed herein is used in a limited sense to describe those solvents which are capable of imparting the half ester form to monomers (a) and (c) when added in the anhydride form.

As a general rule when Jeffamine AP-22 TM is not employed as a reactant monomer, the half esters of monomers (a) and (c) are mixed together with amine monomer (b) in the appropriate ratios described above and dissolved in a suitable non-reactive solvent. When Jeffamine AP-22 TM is employed as a reactant monomer, the anhydride of monomers (a) and (c) can be mixed with a reactive solvent and their half esters can be mixed with either a reactive or non-reactive solvent.

Representative examples of suitable non-reactive solvents include N,N-dimethylformamide, N,N-dimethylacetamide, dimethyl sulfoxide, N-methylpyrrolidone, and alkylbenzenes such as xylene. Mixtures of two or more of such solvents may be employed.

Representative examples of suitable reactive solvents include monofunctional alcohols derived from an alkane having from about 1 to about 4, and preferably from about 1 to about 2 carbon atoms, such as, methanol, ethanol, propanol, butanol and the like.

The preferred alcohol is ethanol.

The total solids content of the monomer mixture in the solvent is from about 30 to about 70% by mixture weight.

The particular amount of solvent is selected in order to form a syrupy paste for carbon fiber impregnation. Without a solvent, the monomer exist as a solid which is disadvantageous for fiber impregnation.

When Jeffamine AP-22 TM is employed as monomer (b), such as when using the LARC-160 monomers described herein, monomers (a) and (c) either in the form of the anhydride or the half ester thereof can be mixed with monomer (b).

When monomers (a) and (c) are initially in the form of anhydrides, they are refluxed with monomer (b), i.e., Jeffamine AP-22 TM, in an amount of reactive solvent, such as ethanol, which constitutes about a 5 mole percent stoichiometric excess of that amount necessary to convert said anhydrides to their respective half esters, e.g., the dianhydride of monomer (a) is converted to its corresponding diethyl ester and the monoanhydride of monomer (c) is converted to its corresponding monoethyl ester. The slight excess of reactive solvent, e.g., ethanol, while not required is preferred because it lowers the viscosity of the syrupy mixture (after Jeffamine AP-22 TM is added) and also provides a very low level of tack to the prepreg prepared from the resin.

Alternatively, monomers (a) and (c) which have already been converted to their corresponding half esters can be mixed with the Jeffamine AP-22 TM and optionally with sufficient solvent to give the mixture a fluid or pasty consistency.

The reason that the half esters of monomers (a) and (c) are preferably employed in the preparation of the prepolymer in the absence of Jeffamine AP-22 TM as monomer (b) instead of the corresponding anhydride is that a reactive solvent would preferably be employed to convert the anhydride to the half ester form. Furthermore, typical reactive solvents, such as ethanol, would be used in excessive amounts in order to give the monomer mixture a pasty or fluid consistency when Jeffamine AP-22 TM is not present. Moreover, it is preferred to conduct the reaction of monomers (a) and (c) with the amine while monomers (a) and (c) are in the form of their corresponding half esters. Consequently, if the reaction is conducted in the presence of a large excess of reactive solvent, e.g. ethanol, to achieve the proper consistency, the anhydrides of monomers (a) and (c) would be converted to their full ester form. Excess solvent is not necessary when Jeffamine AP-22 TM is employed because this monomer has a syrupy consistency and helps to dissolve the monomers (a) and (c) to a pasty consistency. Consequently, in the latter situation the amount of reactive solvent can be restricted and thus the possibility that the anhydrides of monomers (a) and (c) will be converted to their full ester form is reduced.

The above described catalyst, in an amount of from about 0.5 to about 15%, preferably from about 1 to about 12%, and most preferably from about 2 to about 10%, by weight, based on the weight of the monomer mixture, is dissolved in the mixture of monomers prior to the first stage of cure.

The resulting monomer-catalyst mixture is then heated in two stages to induce cure. The first stage curing temperatures, which result in the formation of the prepolymer, are the same temperatures typically employed in curing monomers of the type described herein.

For purposes of discussion the curing procedure of the second stage of cure can be characterized as being of two types. The first type of second stage curing procedure is referred to herein as the "short" polyimide cure. In accordance with this type of cure, the temperatures employed are the same as those typically employed in the second stage cure of the prepolymers of the type described herein. The duration of the second stage short cure, however, is reduced substantially in comparison to that commonly used due to the presence of the catalyst.

The second type of second stage cure is referred to herein as the "low temperature polyimide cure". In accordance with this procedure, the temperatures of the second stage cure are lowered in relation to those of the short polyimide cure to the extent that they fall within the range of curing temperatures employed in curing well known epoxy prepregging resins.

Accordingly, in the first stage the monomer-catalyst solution is heated, preferably under a vacuum to a temperature of from about 250° to about 350° F. (e.g., 300° to 350° F.), preferably from about 310° to about 340° F., and most preferably from about 320° to about 335° F., for a period of from about 0.5 to about 3 hours, preferably from about 0.75 to about 2.5 hours, and most preferably from about 1 to about 2 hours, to form what is believed to be a low molecular weight prepolymer of the formula:

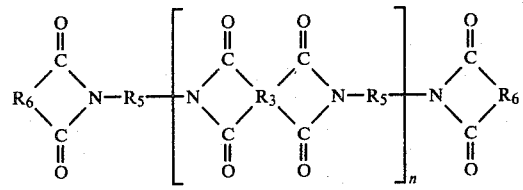

wherein $R_3$, $R_5$, and $R_6$ are as defined above and n can vary from about 1 to about 9, and preferably from about 1 to about 3. The number average molecular weight of the prepolymer is typically less than about 10,000 and can vary from about 800 to about 5000, and preferably from about 800 to about 2000.

When the LARC-160 monomers are employed they are heated in the first reaction stage in the presence of the catalyst to a temperature of from about 280° to about 350° F., preferably from about 300° to about 340° F., and most preferably from about 320° to about 330° F., for a period of from about 0.25 to about 3 hrs, preferably from about 0.5 to about 2.5 hrs, and most preferably from about 0.75 to about 2 hrs to form a prepolymer.

The LARC-160 prepolymer which results is believed to be represented by the structural formula:

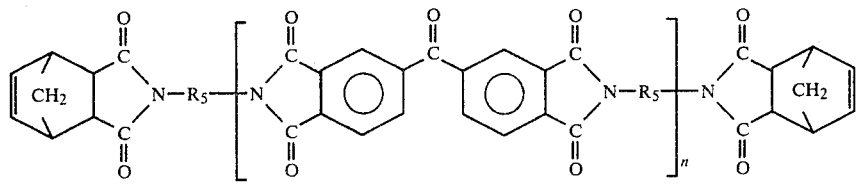

wherein the value of n can vary from about 1 to about 3, and $R_5$ represents a moiety derived from Jeffamine AP-22 ™. The number average molecular weight of the LARC-160 prepolymer is generally from about 600 to about 2,000 (e.g., 1600) depending on the glass transition temperature ($T_g$), flow, and mechanical properties sought to be imparted to the system.

The pressures under which the prepolymer is formed during the first stage of cure can vary from about 2 to about 30 in.Hg, and preferably from about 2 to about 4 in.Hg. The first stage cure at the recited pressures can be accomplished by autoclaving, vacuum bag operations and the like.

In the second stage short cure procedure the resulting prepolymer is typically placed in a compression mold heated to or at a temperature of about 375° to about 425° F., (e.g. 400° F.) under a pressure of from about 150 to about 250 psi; and preferably from about 175 to about 225 psi (e.g. 200 psi). The temperature of the mold is then raised preferably at a rate of from about 4° to about 6° F./minute to a temperature of from about 450° to about 625° F., (e.g. 600° F.) while under a continuous or intermittent pressure of from about 175 to about 225 psi (e.g. 200 psi) and maintained thereat for a period of about 10 to about 120 minutes (e.g. 15 minutes). Typically, higher cure temperatures are employed in conjunction with shorter cure times. While the progressive increase in the second stage short cure may be initiated in the compression mold from room temperature, this is not preferred since it would waste time and the pressure could not be applied to any advantage until a temperature of about 375° F. had been reached.

It is an unexpected discovery that improved interlaminar shear strengths are observed in a carbon fiber composite prepared from the above-described polyimide when the elevated pressures described above, e.g., 200 psi, are applied during the second stage short cure procedure at a significantly lower temperature in the cure cycle than would otherwise be conventionally employed in the absence of a catalyst. Such improvements are observed when the elevated pressures are applied at temperatures of from about 375° to about 425° F., and preferably from about 390° to about 410° F. (e.g., 400° F.) during the short cure procedure.

The resulting polyimide is allowed to slowly cool to room temperature before being removed from the mold.

In the low temperature cure the prepolymer, preferably while in a vacuum bag apparatus, is heated to or at a temperature of from about 300° to about 330° F., (e.g. 325° F.) and a pressure of from about 2 to about 30 in.Hg (e.g. 15 in.Hg) for a period of from about 0.5 to about 2 hrs depending on the temperature. The temperature of the polymer is then raised, preferably at a rate of from about 4° to about 6° F./min., until a temperature of from about 375° to about 390° F. (e.g. 380° F.) is reached. The temperature is maintained thereat for a period of from about 4 to about 10 hours, preferably from about 6 to about 9 hours at a pressure of about 80 to about 150 psi, preferably at a pressure of about 100 to about 150 psi. The polyimide is then preferably allowed to cool.

The pressures employed during either the first or second stage of cure can also be applied intermittently in a bumping action. Thus, bumping, e.g. the release of pressure to atmospheric pressure with quick reapplication of pressure is conducted during the cure to release gaseous volatiles that have built up in the layup. Bumping is usually performed several times before fumes are no longer observed.

When the polyimide resin has completed the second stage short cure no post-curing is necessary and the cured resin can be used directly.

When the polyimide resin has completed the second stage low temperature cure it is preferably subjected to a free standing post-cure by heating it, preferably rapidly at a rate of about 8° to about 12° F./min. (e.g. 10° F./min.), to a temperature of from about 375° to about 385° F. (e.g. 380° F.) and maintained thereat for a period of about 20 to about 30 minutes. The temperature is thereafter raised, preferably at a slow rate of about 5° F./min., in a step wise manner preferably in increments of about 20° to about 25° F. and held at each increment preferably for a period of about 20 to about 30 minutes. This incremental increase in temperature is continued until a temperature of about 450° to about 525° F., preferably about 475° to about 500° F. is reached at which time the temperature is maintained thereat preferably for a period of about 30 to about 60 minutes.

The low temperatures employed in the low temperature cure procedure permit use of the less expensive bagging and adhesive materials currently used in autoclave curing of typical epoxy prepreg materials. If the polyimide prepolymer were to be cured in accordance with the low temperature cure procedure in the absence of a catalyst then a composite prepared therefrom is foamed with a high void content which render it unsuitable for any useful purpose after post-curing.

In contrast, the high temperatures employed in the short cure procedure require use of the much more expensive sealers and bagging materials typically employed in curing polyimides of the type described herein.

Low temperature cure procedures are employed when the end product such as a carbon fiber composite after post-curing must exhibit thermooxidative stability at use temperatures up to about 180° F., particularly in humid environments and must be able to withstand sporadic increases in temperature up to about 350° F. for short periods.

Short cure procedures are employed when the end product is required to exhibit good thermooxidative stability at temperatures which can be as high as 500° F.

The monomer mixtures employed in preparing the polyimides described herein have a high viscosity and may be used in the preparation of carbon fiber composites. Carbon fiber reinforced composite structures can be, via a prepreg form or not, formed into various kinds of articles by using any conventional molding technique such as a press molding technique, vacuum bag autoclave molding technique, and the like.

By the term "composite structure" is meant a heterogeneous assembly comprised of two or more components, at least one of which defines a continuous phase which is hereinafter designated as the "matrix" component, and at least one other component defining reinforcing means or reinforcement for the said composite assembly, the reinforcing means being contiguous to and firmly bonded to the matrix component. For example, the respective components of such composite assemblies can be either coated, layered, stratified and/or laminated, randomly filled and the like.

Thus, the composite structures of the present invention comprise the catalyst cured polyimide composition described herein as the matrix component, and carbon fibers as the reinforcing material. Hybrid reinforcing materials such as carbon and glass fibers may also be employed.

The composite fabrication technique may be selected from any of those procedures previously employed in the advanced engineering composite art. Typically a composite article is formed by impregnating individual lamina (e.g., carbon fiber layers, ribbons, plies, etc.) of carbon fibers arranged in the desired configuration with the thermosetable polyimide monomer-catalyst mixture described herein which ultimately serves as the matrix or continuous phase in the composite article.

The impregnated lamina are then stacked as needed and molded with conventional molding techniques at temperatures and pressures of the type described herein. The polyimide forming composition described herein lends itself particularly to vacuum bagging and autoclaving of the impregnated lamina to achieve the first and second stages of cure. Compression molding may also be used to achieve the second stage of cure.

The carbon fibers employed in the preparation of the composite are well known in the art.

Briefly, the terms "carbon" fibers or "carbonaceous" fibers are used herein in the generic sense and include graphite fibers as well as amorphous carbon fibers which result after a thermal carbonization or graphitization treatment. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction. Graphite fibers generally have a higher Young's modulus than do amorphous carbon fibers and in addition are more highly electrically and thermally conductive.

Numerous procedures have been employed for the conversion of various organic polymeric fibrous materials to a carbonaceous form while retaining the original fibrous configuration essentially intact. Such procedures have in common the thermal treatment of a fibrous precursor in an appropriate atmosphere or atmospheres which is commonly conducted in a plurality of heating zones, or alternatively in a single heating zone wherein the fibrous material is subjected to progressively increasing temperatures. See, for instance, U.S. Pat. No. 3,539,295 for a representative conversion process, the disclosure of which is herein incorporated by reference.

More specifically, organic polymeric precursor fibrous materials of the type described herein may be initially stabilized by treatment in an appropriate atmosphere at a moderate temperature (e.g., 200° to 400° C.), and subsequently heated in an inert atmosphere at a more highly elevated temperature, e.g., 900° to 1,000° C., or more, until a carbonaceous fibrous material is formed. If the thermally stabilized material is heated to a maximum temperature of 2,000° to 3,100° C. (preferably 2,400° to 3,100° C.) in an inert atmosphere, substantial amounts of graphite carbon are commonly detected in the resulting carbon fiber, otherwise the carbon fiber will commonly exhibit a substantially amorphous X-ray diffraction pattern.

The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g., oxygen and hydrogen) are substantially expelled. Suitable organic polymeric fibrous materials from which the carbon fibers may be derived include an acrylic polymer, a cellulosic polymer, a polyamide, a polybenzimidazole, polyvinyl alcohol, etc. Acrylic polymeric materials are particularly suited for use as precursors in the formation of the carbon fibers. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole. Preferred carbonization and graphitization techniques for use in forming the carbon fibers are described in commonly assigned U.S. Pat. Nos. 3,667,705; 3,775,520; and 3,900,556. Each of the disclosures of these patents is herein incorporated by reference.

The carbon fibers may also be subjected to various surface treatments as illustrated by U.S. Pat. Nos. 3,723,150; 3,723,607; 3,745,104; 3,754,957; 3,762,941; 3,767,774; 3,782,278; 3,821,013; 3,824,398; 3,859,187; and 3,894,884 the disclosures of which are herein incorporated by reference.

Carbon fibers which typically are employed in preparing the composites described herein contain at least about 90 percent carbon by weight. In a preferred embodiment, the carbon fibers contain at least about 95 percent carbon by weight and exhibit a predominantly graphitic X-ray diffraction pattern.

Carbon fibers are generally employed in the configuration of a ribbon which may comprise a single flat tow of continuous carbon filaments or a plurality of substantially parallel multifilament fiber bundles which are substantially coextensive with the length of the ribbon.

In the latter embodiment the carbon fiber bundles of the ribbon may be provided in a variety of physical configurations. For instance, the bundles of the ribbon may assume the configuration of continuous lengths of multifilament yarns, tows, strands, cables, or similar fibrous assemblages. The multifilament bundles are preferably lengths of a continuous multifilament yarn. The fiber bundles with the ribbon optionally may be provided with a twist which tends to improve their handling characteristics. For instance, a twist of about 0.1 to 5 tpi, and preferably about 0.3 to 1 tpi, may be imparted to each fiber bundle. Also, a false twist may be used instead of or in addition to a real twist. Alternatively, the fiber bundles may possess substantially no twist.

Multifilament fiber bundles may be provided within the ribbon in a substantially parallel manner in the substantial absence of bundle crossovers to produce a flat ribbon. The number of parallel multifilament bundles present within the carbon fiber ribbon may be varied widely, e.g., from 6 to 1,000 or more. In one embodiment, a ribbon is selected having a weft pick interlaced with substantially parallel fiber bundles in accordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing carbon fiber tapes for resin impregnation in accordance with the procedures described herein.

The carbon fiber composite will generally exhibit a carbon fiber volume of from about 45 to about 75%, and preferably from about 55 to about 65%, by volume based on the volume of the composite, and correspondingly from about 22 to about 55%, and preferably from about 35 to about 45%, by volume, polyimide, based on the volume of the composite.

The carbon fiber-polyimide composites described herein which are cured using the short temperature cure can be employed in aerospace applications, such as jet engine compressor components, including blades, vanes, air seals, engine casing parts and the like depending on the curing and post curing profile and the associated thermal stability imparted thereby. The carbon-fiber polyimide composites cured using the low temperature cure, because of their lower temperature stability can be employed in the uses typically reserved for carbon fiber epoxy components such as stabilizer skins, ailerons, spoilers and the like.

The invention is additionally illustrated in connection with the following Examples which are to be considered as illustrative of the present invention. It should be understood, however, that the invention is not limited to the specific details of the Examples. All parts and percentages in the claims and in the remainder of the specification are by weight unless otherwise specified.

EXAMPLE 1

This Example illustrates the preparation of carbon fiber composite parts using LARC-160 monomer system, a USP-138 catalyst system, and a low temperature cure cycle.

500 parts, by weight, of a mixture of LARC-160 monomers comprising 0.735 mole of the diethyl ester of benzophenone tetracarboxylic acid, 1.094 moles of the monoethyl ester of nadic anhydride, 2.56 amine molar equivalents of Jeffamine AP-22 TM and a small amount of ethanol are placed in a suitable vessel equipped with a stirrer and the mixture is heated to 120° F. 25 gms of USP-138 TM catalyst is added which readily mixes and dissolves into the monomer mixture. The monomer-catalyst solution contains a solids content of about 95% in ethanol. The monomer-catalyst solution is then heated to between 150° and 160° F. to decrease its viscosity and a film of the mixture is cast onto release paper. A ribbon of Celion-6000 graphite fibers which have been given an oxidative surface treatment having a spacing of 9 tows per inch is then calendered into the film to form a single lamina with a fiber content of 138.4 gm/m².

The above procedure is repeated several times and resulting lamina are layed up to form a 16 ply unidirectional prepreg panel with dimensions of 3.5"×11" and a thickness of 80 mils. At a resin density of 1.24 gm/cc. the resin weight of the prepreg is 40%. The prepreg is wrapped in TX-1040 a continuous porous Teflon TM sheet. The top and bottom faces of the prepreg are covered with 120 glass bleeder plies. The layup is then wrapped in a Tedlar TM film and the resulting prepreg is placed in a breather bag of 1581 glass equipped with a vacuum port. The prepreg is heated to a temperature of 325° F. at a rate of 4° to 6° F./minute. A vacuum of 28" Hg is applied during the entire heatup period. The prepreg is maintained at this temperature for one hour to form a panel. This completes the first stage of cure.

The panel is then subjected to a low temperature cure procedure as follows. The temperature of the panel is raised to 380° F. at a rate of 4°-6° F./min. and maintained thereat for eight hours while the pressure is bumped at 85 psi until minimal fumes are observed. The panel is then subjected to a free standing post-cure by raising the temperature rapidly, i.e. 15° F./min. from room temperature to 200° F. and thereafter at a rate of 10° F./min. to 380° F. The temperature is maintained thereat for 30 minutes. The temperature is then raised in a stepwise manner at a rate of 5° F./min. to incremental plateaus of 405° F., 430° F., 455° F., and 475° F. to achieve post cure. The temperature at each plateau is maintained for 25 minutes except that the temperature plateau at 475° F. is maintained for 30 mins. The total post-cure time is 3 hours.

Several other test panels are prepared in a similar manner with the exception that the amount of catalyst and some of the curing conditions are varied as shown at Table I. Each test panel including a control panel which does not employ a catalyst in its preparation is tested for flexural strength and modulus as well as interlaminar shear strength at room temperature (i.e. 72° F.) and at 350° F. When testing is performed at elevated temperatures, i.e. 350° F., the sample is heated first to this temperature for 2 minutes, unless otherwise specified at Table I, before conducting the test. To provide a basis for comparison all fiber volumes in the test panels are normalized to 62%.

As may be seen from the data of Table I, the LARC-160 monomers cannot be cured using a lower temperature of about 380° F. which is similar to that used for epoxies in the absence of a catalyst. However, when a peroxy ketal catalyst, such as USP-138 TM, is employed a certain measure of cure can be achieved at this low cure temperature yielding a composite with a useful degree of mechanical properties at room temperature and at 350° F.

TABLE I

| | | | Flexural | | Interlaminar |
|---|---|---|---|---|---|
| Run No. | % Catalyst[1] | Test Temperature[2] (°F.) | Strength (ASTM D 790) (ksi) | Modulus (ASTM D 790) (msi) | Shear Strength (ASTM D 2344) (psi) |
| 1 | 7.5 | 72 | 162.0 | 19.9 | 5950 |
|   |     | 350 | 46.4 | ND | 3700 |
| 2 | 10 | 72 | 144.0 | 22.0 | 5400 |
|   |    | 350 | 82.0 | — | 3900 |
| 3[a] | 7.5 | 72 | 124.0 | 19.0 | 5740 |
|   |     | 350 | 26.5 | ND | 1170 |

TABLE I-continued

| Run No. | % Catalyst[1] | Test Temperature[2] (°F.) | Flexural Strength (ASTM D 790) (ksi) | Flexural Modulus (ASTM D 790) (msi) | Interlaminar Shear Strength (ASTM D 2344) (psi) |
|---|---|---|---|---|---|
| 4[a] | 10 | 72 | 119 | 21.8 | 5900 |
|  |  | 350 | 83.0 | ND | 3600 |
| 5[a] [b] | 7.5 | 72 | 96.0 | 21.8 | 5600 |
|  |  | 350 | 18.0 | ND | 1680 |
| 6[a] [b] | 10 | 72 | 246.0 | 21.1 | 6800 |
|  |  | 350 | 126.0 | ND | 4900 |
| 7 | 0 | 72 | Panel is badly foamed and warped and is unsuitable for testing. | | |
|  |  | 350 | | | |

[1]% by weight based on the weight of LARC-160 monomers.
[2]Flexural and shear strength samples maintained at 350° F. for 2 minutes prior to testing.
[a]Bleeder plies were changed after the first stage of cure. Low temperature cure time is 6 hours at 380° F.
[b]Post cure conducted in a compression mold under contact pressure of about 5 psi.
msi = million lbs/in$^2$
psi = lbs/in2
ksi = thousand lbs/in2

EXAMPLE 2

This Example illustates the preparation of carbon fiber composite panels using a LARC-160 monomer system, a USP-138 ™ catalyst, and a short cure cycle.

Accordingly, prepregs are prepared in accordance with Example 1, using LARC-160 and varying amounts of catalyst as shown at Table II, and are subjected to a first stage of cure as follows. Each prepreg laminate is wrapped in a Tedlar ™ film and placed in a breather bag equipped with a vacuum port. A caul plate was also used to help flatten the laminate and prevent the appearance of "ribs". A vacuum of 28 in.Hg is applied while heating the prepreg to 325° F. at a rate of 5° F./min. and maintained thereat for one hour to form a panel. Each layup is cooled while still under the vacuum to 72° F. This completes the first stage of cure. The resulting panel is then placed in a hot compression mold maintained at 400° F. Contact pressure is applied and the mold is immediately heated at a rate of 5° F./min. to 525° F. Upon reaching 525° F. the layup is bumped until minimal fumes are observed. Upon completion of the bumping procedure the panel is heated to 600° F., at a pressure of 200 psi and maintained thereat for 15 minutes. Ordinarily the temperature would be maintained at 600° F. and 200 psi for two hours and then be subjected to a free standing post-cure for four hours.

The resulting panels are allowed to cool and are tested for flexural strength and modulus as well as interlaminar shear strength. The results are summarized at Table II. Fiber volumes of the panel are normalized to 62% in determining flexural values. Cured panel fiber volume loadings varied from 54.2 to 65% by volume for run 1, from 56.6 to 62.3%, by volume, for run 2, from 58.2 to 62%, by volume, for run 3, and from 62 to 71.7% by volume, for run 4.

As may be seen from the data of Table II, the short cure of the polyimide containing the described catalyst results in composites with higher elevated temperature properties than those obtained with conventional LARC-160. Only room temperature shear strength is lowered below that of the control. However, the value obtained is still at an acceptable level.

TABLE II

| Run No. | % Catalyst[1] | Test Temperature (°F.) | Flexural Strength (ASTM D 790) (ksi) | Flexural Modulus (ASTM D 790) (msi) | Interlaminar Shear Strength (ASTM D 2344) (psi) |
|---|---|---|---|---|---|
| 1 | 5.0 | 72 | 259–286 | ND | 8,330–12,800 |
|  |  | 500 | 94.6 | 18.1 | 3,450–5,460 |
| 2 | 7.5 | 72 | 129–207 | ND | 5,900–7,500 |
|  |  | 500 | 116.4 | 19.1 | 3,600–4,700 |
| 3 | 10.0 | 72 | 127–141 | ND | 5,000–6,000 |
|  |  | 500 | 95.4 | 18.9 | 2,900–3,600 |
| 4 | 0 | 72 | 97.4–318 | 19.9 | 14,400–17,000 |
|  |  | 500 | 48.1 | 10.6 | 750–1,900 | ksi = thousand lbs/in$^2$
msi = million lbs/in2
psi = lbs/in$^2$
[1]% by weight based on the weight of the LARC-160 monomers.
ND = not determined

EXAMPLE 3

This example illustrates the unexpected advantages of applying pressures at significantly lower temperatures during the second stage of a short cure cycle.

Accordingly, laminated prepregs are prepared in accordance with Example 1 using the LARC-160 monomers, and the carbon fibers described therein. The LARC-160 monomers have incorporated therein 2.5% by weight, based on the weight of LARC-160 monomer mixture, of USP-138 ™ catalyst. Each prepreg is heated to 325° F. at a rate of 4°–6° F./min. and maintained thereat for one hour under a vacuum of 28 in.Hg to form a panel and complete the first stage of cure. The first stage of cure is conducted using a caul plate. A vacuum sealer with a dam is employed and no Tedler ™ wrap is used. The panel is then placed in a matched metal die mold and heated from 400° F. to 500° F. at the rate of 5° F./min while applying a pressure of 200 psi continuously from 400° to 500° F. Upon reaching 500° F. bumping is performed several times until minimal fumes are observed and then heated from 500° to 600° F. under a pressure of 200 psi. The temperature is maintained at 600° F. for 15 minutes to complete the second stage of cure. No post-cure is conducted. The resulting cured panel is tested at room temperature and 500° F. for flexural strength and modulus as well as interlaminar shear strength. The results are summarized at Table III as run 1.

A similar test panel is prepared and subjected to a first stage cure by heating at a rate of 4°–6° F./min to 325° F. and maintained thereat for one hour. The first stage cured panel is then placed in a matched metal die mold and heated from 400° F. to 525° F. under a pressure of 200 psi. Upon reaching 525° F., a pressure of 200 psi is applied while the temperature is raised to 600° F. The temperature is maintained at 600° F. for 15 minutes at a pressure of 200 psi. No post-cure is employed.

The resulting cured panel is tested for mechanical properties as in run 1 of this example. The results are summarized at Table III as run 2.

The cured panel fiber volumes of each test panel are normalized to 62% from 69.6% (run 1) and from 64.1% (run 2) is determining flexural values.

As can be seen from the data of Table III, the interlaminar shear strength of the test panel of run 1 is substantially improved particularly at the 500° F. test temperature (where an improvement of almost 100% is observed) when pressure is applied at an early stage during the second stage of cure (i.e. 400° F.) rather than at the latter stages of cure (i.e. 525° F.) which is the generally accepted procedure. While the flexural strength of the test panel of run 1 is slightly lower than that of run 2 this difference is considered insignificant.

TABLE III

| Run No. | Test Temperature (°F.) | Flexural | | Interlaminar Shear Strength (ASTM D 2344) (psi) |
| --- | --- | --- | --- | --- |
| | | Strength (ASTM D 790) (ksi) | Modulus (ASTM D 790) (msi) | |
| 1 (200 psi applied at 400° F.) | 72 500[a] | 267 180 | 17.9 ND | 17,500 6,300 |
| 2 (200 psi applied at 525° F.) | 72 500[a] | 299[b] 156 | 19.6 ND | 15,700 3,700[c] |

[a]Time at test temperature is 5 minutes.
[b]First failures observed from 86 to 98% of ultimate tensile strength
[c]Plastic failure
ND = Not determined
ksi = thousand lbs/in$^2$
msi = million lbs/in2
psi = lbs/in2

COMPARATIVE EXAMPLE

The following comparative example illustrates the effect of employing benzoyl peroxide as a catalyst for curing a LARC-160 monomer system.

LARC-160 monomers (10.7 g) were placed in a 150 ml beaker. The beaker containing the monomers was placed in a vacuum oven at 80° C. The oven is attached to a pump to pull maximum vacuum. After about two hours the temperature reaches 320° F. The LARC material at this point is heavily foamed rising completely out of the beaker. The beaker and material are removed from the oven and the LARC-160 was chipped up using a spatula. The beaker containing the fine particle resin is placed in a vacuum oven and heated at 325° F. under a vacuum of 28" Hg for one hour and ten minutes.

The resulting prepolymer is pulverized and placed into three separate 10 cc beakers (2 grams in each). Benzoyl peroxide is dissolved in a few mls of acetone and added as a solution to each of the LARC-160 samples. Addition is done at the level of 2.5, 5 and 10% of resin weight. The acetone is allowed to evaporate. The following day each of the samples turned gummy brown indicating a reaction has taken place at room temperature. Thus, benzoyl peroxide is of no value in an attempt to catalyze the LARC-160 resin at elevated temperature since it would not remain inactive during the first stage of cure which is conducted at temperatures substantially above room temperature.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing a carbon fiber reinforced composite article wherein a polyimide constitutes the continuous phase which comprises:
   (1) providing a polyimide forming catalyst-monomer mixture comprising:
      (a) at least one ester of the formula:

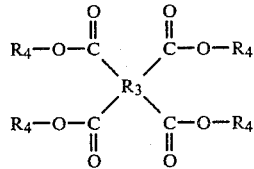

wherein $R_3$ is a tetravalent aryl radical, and $R_4$ is selected from the group consisting of a lower alkyl radical having 1 to 4 carbon atoms, and hydrogen, with two $R_4$ groups being alkyl and two $R_4$ groups being hydrogen;

(b) at least one amine of the formula:

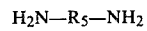

wherein $R_5$ is a divalent aryl radical; and
(c) at least one ester of the formula:

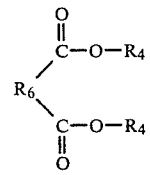

wherein $R_4$ is selected from the group consisting of a lower alkyl radical having 1 to 4 carbon atoms, and hydrogen with one $R_4$ group being alkyl and one $R_4$ group being hydrogen, and $R_6$ is a divalent radical of the formula:

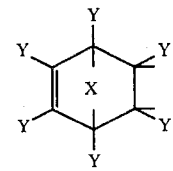

wherein Y, which is the same or different, is selected from the group consisting of hydrogen, and methyl and X is an alkylidene radical of from 1 to 6 carbon atoms; wherein monomers (a), (b) and (c) are present in said mixture at a molar ratio of n:(n+x):y respectively, wherein n is an integer of from about 1 to about 20, x is an integer of from about 0.5 to about 1, and y is an integer of from about 1.5 to about 2, and from about 0.5 to about 15%, by weight, based on the weight of the monomer mixture, of at least one peroxide catalyst represented by the structural formula:

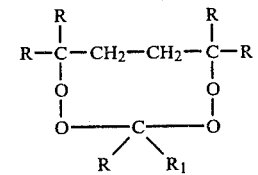

wherein R, which is the same or different, is a lower alkyl group having from 1 to about 3 carbon atoms, and $R_1$ is an alkyl acetate group of the formula:

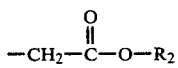

wherein $R_2$ is an alkyl group having from 1 to about 4 carbon atoms;

(2) impregnating at least one carbon fiber lamina with said polyimide forming catalyst-monomer mixture of step (1);

(3) reacting said polyimide forming catalyst-monomer mixture in the presence of the at least one carbon fiber lamina at a temperature of from about 250° to about 350° F. for a period of from about 0.5 to about 3 hours and at a pressure of from about 2 to about 30 in.Hg to form a prepolymer; and (4) curing the prepolymer to form a carbon fiber reinforced composite article while employing a short cure procedure which comprises the steps of heating the prepolymer to a temperature of from about 375° to about 425° F. at a continuous or intermittent pressure of from about 175 to about 225 psi; raising the temperature of the prepolymer to a temperature of from about 450° to about 625° F. while under a continuous or intermittent pressure of from about 175 to about 225 psi; and maintaining the temperature of the prepolymer thereat for a period of about 10 to about 120 minutes.

2. The process for preparing a carbon fiber reinforced composite article wherein a polyimide constitutes the continuous phase according to claim 1 wherein monomer (a) comprises the diethyl ester of benzophenone tetracarboxylic acid, monomer (c) comprises the monoethyl ester of 5-norborene-2,3-dicarboxylic anhydride, and monomer(b) comprises at least one polyamine having the formula:

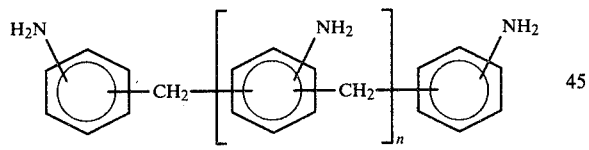

wherein n is an integer the average value of which can vary from about 0 to about 2, and wherein the ratio of monomers a, b, and c in said mixture is from about 1:1.6:1.5 to about 1:1.6:2, respectively.

3. The process for preparing a carbon fiber reinforced composite article wherein a polyimide constitutes the continuous phase according to claim 2 wherein the polyamine monomer (b) comprises 75 mole percent methylene dianiline, and about 25 mole percent of a mixture of the polyamine wherein n of the structural formula is from about 1 to about 2, and the catalyst is 3,6,6,9,9,-pentamethyl-3(ethylacetate)-1,2,4,5-tetraoxycyclononane.

4. A process for preparing a carbon fiber reinforced composite article wherein a polyimide constitutes the continuous phase which comprises:

(1) providing a polyimide forming catalyst-monomer mixture comprising:
(a) at least one ester of the formula:

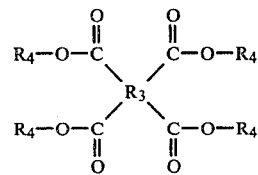

wherein $R_3$ is a tetravalent aryl radical, and $R_4$ is selected from the group consisting of a lower alkyl radical having 1 to 4 carbon atoms, and hydrogen, with two $R_4$ groups being alkyl and two $R_4$ groups being hydrogen;

(b) at least one amine of the formula:

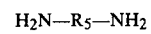

wherein $R_5$ is a divalent aryl radical; and (c) at least one ester of the formula:

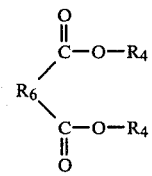

wherein $R_4$ is selected from the group consisting of a lower alkyl radical having 1 to 4 carbon atoms, and hydrogen with one $R_4$ group being alkyl and one $R_4$ group being hydrogen, and $R_6$ is a divalent radical of the formula:

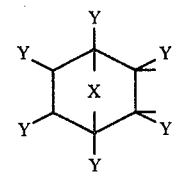

wherein Y, which is the same or different, is selected from the group consisting of hydrogen, and methyl and X is an alkylidene radical of from 1 to 6 carbon atoms; wherein monomers (a), (b) and (c) are present in said mixture at a molar ratio of n:(n+x):y respectively, wherein n is an integer of from about 1 to about 20, x is an integer of from about 0.5 to about 1, and y is an integer of from about 1.5 to about 2, and from about 0.5 to about 15%, by weight, based on the weight of the monomer mixture, of at least one peroxide catalyst represented by the structural formula:

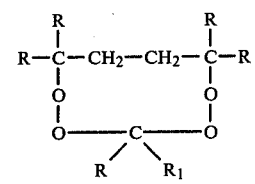

wherein R, which is the same or different, is a lower alkyl group having from 1 to about 3 carbon atoms, and $R_1$ is an alkyl acetate group of the formula:

$$-CH_2-\overset{\overset{O}{\|}}{C}-O-R_2$$

wherein $R_2$ is an alkyl group having from 1 to about 4 carbon atoms;

(2) impregnating at least one carbon fiber lamina with said polyimide forming catalyst-monomer mixture of step (1);

(3) reacting said polyimide forming catalyst-monomer mixture in the presence of the at least one carbon fiber lamina at a temperature of about 250° to about 350° F. for a period of from about 0.5 to about 3 hours and at a pressure of from about 2 to 30 in.Hg to form a prepolymer; and (4) curing the prepolymer to form a carbon fiber reinforced composite article while employing a low temperature cure procedure which comprises the steps of heating the prepolymer to a temperature of from about 300° to about 330° F. while under a continuous or intermittent pressure of from about 2 to about 30 in.Hg; raising the temperature of the prepolymer therefrom until a temperature of from about 375° to about 390° F. is attained; maintaining the temperature of the prepolymer thereat for a period of from about 4 to about 10 hours to form a polyimide.

5. The process for preparing a carbon fiber reinforced composite article wherein a polyimide constitutes the continuous phase according to claim 4 wherein monomer (a) comprises the diethyl ester of benzophenone tetracarboxylic acid, monomer (c) comprises the monoethyl ester of 5-norborene-2,3-dicarboxylic anhydride, and monomer (b) comprises at least one polyamine having the formula:

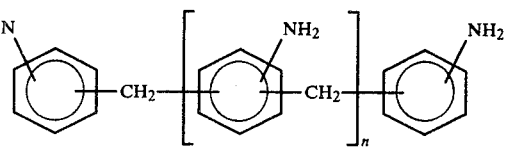

wherein n is an integer the average value of which can vary from about 0 to about 2, and wherein the ratio of monomers a, b, and c in said mixture is from about 1:1.6:1.5 to about 1:1.6:2, respectively.

6. The process for preparing a carbon fiber reinforced composite article wherein a polyimide constitutes the continuous phase according to claim 4 wherein the polyamine monomer (b) comprises about 75 mole percent methylene dianiline, and about 25 mole percent of a mixture of the polyamine wherein n of the structural formula is from about 1 to about 2, and the catalyst is 3,6,6,9,9,-pentamethyl-3(ethylacetate)-1,2,4,5-tetraoxycyclononane.

7. The process for preparing a carbon fiber reinforced composite article wherein a polyimide constitutes the continuous phase of claim 4 wherein the low temperature cure procedure is followed by a post-cure which comprises heating the polyimide to a temperature of from about 375° to about 385° F. for a period of about 20 to about 30 minutes, raising the temperature of the polyimide in a stepwise manner in increments of about 20° to about 25° F., until a temperature of about 450° to about 525° F. is reached, and maintaining the temperature thereat for a period of about 30 to about 60 minutes.

* * * * *